United States Patent
Reinhart

(10) Patent No.: US 12,379,055 B2
(45) Date of Patent: Aug. 5, 2025

(54) CHECK VALVE CONNECTOR SYSTEM

(71) Applicant: Gregory Reinhart, Alvada, OH (US)

(72) Inventor: Gregory Reinhart, Alvada, OH (US)

(*) Notice: Subject to any disclaimer, the term of this patent is extended or adjusted under 35 U.S.C. 154(b) by 54 days.

(21) Appl. No.: 18/509,518

(22) Filed: Nov. 15, 2023

(65) Prior Publication Data
US 2024/0200701 A1 Jun. 20, 2024

Related U.S. Application Data

(60) Provisional application No. 63/432,514, filed on Dec. 14, 2022.

(51) Int. Cl.
E03F 7/04 (2006.01)
E02B 11/00 (2006.01)
F16K 15/04 (2006.01)
F16L 29/00 (2006.01)
F16L 41/02 (2006.01)

(52) U.S. Cl.
CPC .......... F16L 29/002 (2013.01); E02B 11/005 (2013.01); E03F 7/04 (2013.01); F16K 15/048 (2013.01); F16L 41/021 (2013.01)

(58) Field of Classification Search
CPC ...... F16L 41/021; E02B 11/00; E02B 11/005; E03F 7/04; Y10T 137/87676; F16K 15/021; F16K 15/04; F16K 21/18
USPC ...................... 405/36, 43, 44, 45, 47, 48, 49
See application file for complete search history.

(56) References Cited

U.S. PATENT DOCUMENTS

| 444,564 A | 1/1891 | Copeland |
| 2,135,860 A * | 11/1938 | Taysen ..................... E02B 11/00 405/43 |
| 2,798,768 A | 7/1957 | Babin |
| 2,990,845 A * | 7/1961 | Sklash ..................... E03F 7/04 137/358 |
| 3,681,925 A | 8/1972 | Schmunk et al. |
| 3,802,202 A | 4/1974 | Maroschak |

(Continued)

FOREIGN PATENT DOCUMENTS

| DE | 2459642 A1 | 7/1976 |
| DE | 3515477 A1 | 10/1986 |

(Continued)

OTHER PUBLICATIONS

"Greydock, Drain, Waste and Vent Solutions", webpage, https://www.greydock.com/.

(Continued)

Primary Examiner — Kevin F Murphy

(57) ABSTRACT

The present disclosure provides a check valve connector system for coupling a lateral pipe and a main pipe. The check valve connector system can include a fitting, a saddle member, and a check valve. The fitting can include a first end, a second end, an elbow, and an opening. The opening can be formed between the first end and the second end. The first end can be configured to receive the main pipe. The elbow can extend outwardly from the fitting and can include an aperture. The aperture can include a pear-shaped cross section and can be configured to receive the lateral pipe. The saddle member can be configured to couple the fitting and the main pipe. The saddle member can include a hole for receiving the fitting. The check valve can be disposed between the fitting and the saddle member.

20 Claims, 12 Drawing Sheets

(56) References Cited

U.S. PATENT DOCUMENTS

Figure 1:
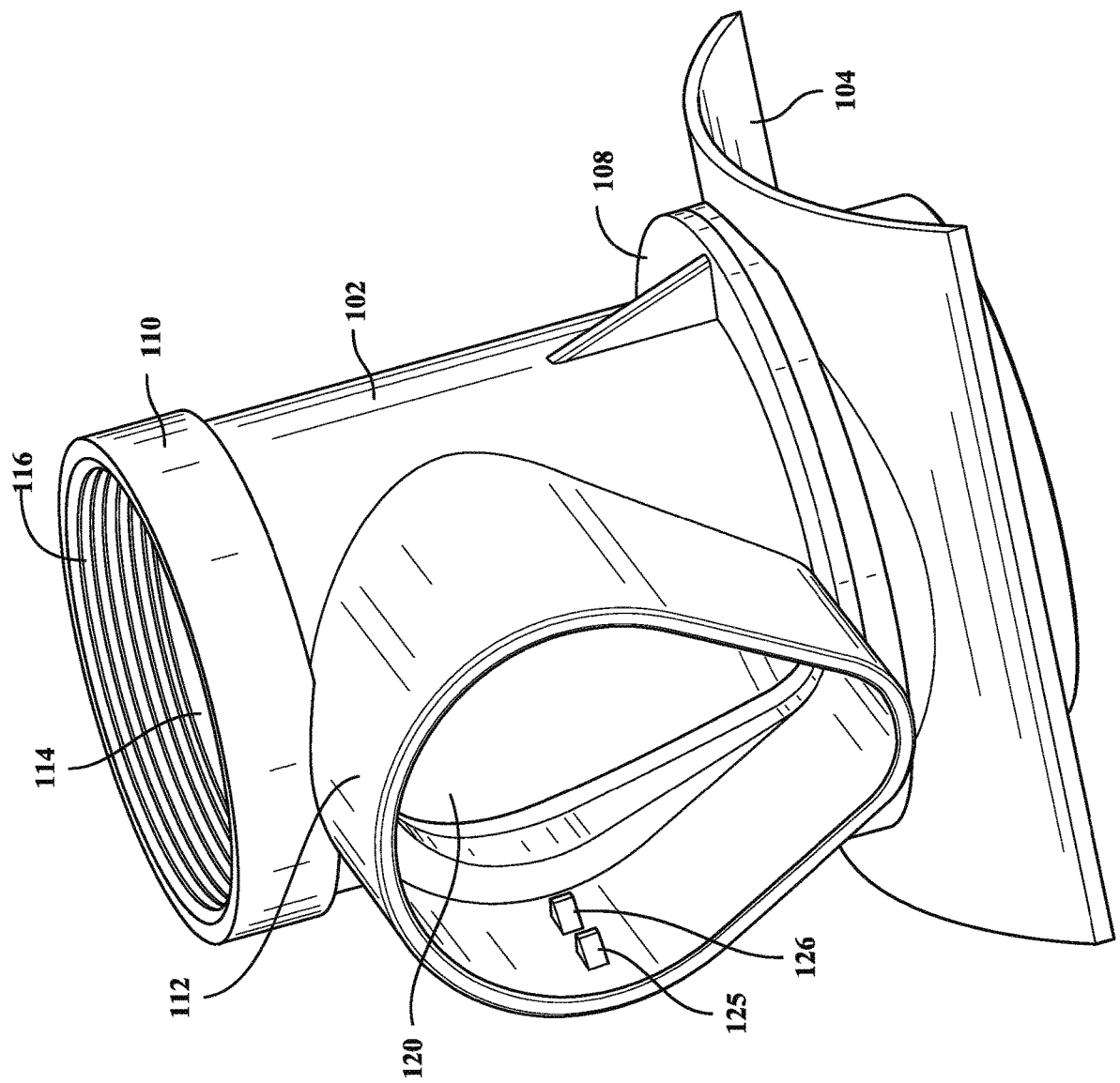

| | | | |
|---|---|---|---|
| 3,878,685 A | 4/1975 | Schmunk | |
| 3,926,222 A | 12/1975 | Shroy et al. | |
| 4,020,639 A | 5/1977 | Nagare et al. | |
| 4,024,894 A | 5/1977 | Drossbach | |
| 4,260,283 A * | 4/1981 | Croy | E02D 19/10 |
| | | | 405/36 |
| 4,704,047 A | 11/1987 | Oldfelt et al. | |
| 4,930,936 A | 6/1990 | Hegler et al. | |
| 5,092,709 A * | 3/1992 | Davis | E02B 11/00 |
| | | | 405/38 |
| 5,560,163 A | 10/1996 | Carlton | |
| 9,447,902 B2 | 9/2016 | Tendick | |
| 10,082,213 B1 * | 9/2018 | Character | E03F 5/042 |
| 2002/0172557 A1 | 11/2002 | Chen | |
| 2003/0031512 A1 | 2/2003 | Goddard | |
| 2006/0070658 A1 | 4/2006 | Nakata et al. | |
| 2009/0052990 A1 | 2/2009 | Richardson | |
| 2010/0171303 A1 * | 7/2010 | Krausz | F16L 27/0849 |
| | | | 285/184 |
| 2011/0174378 A1 | 7/2011 | Leung | |
| 2013/0315668 A1 | 11/2013 | Poerio | |
| 2017/0183860 A1 | 6/2017 | Nishiyama | |
| 2021/0108754 A1 | 4/2021 | Gage | |
| 2023/0279653 A1 | 9/2023 | Reinhart | |

FOREIGN PATENT DOCUMENTS

| | | |
|---|---|---|
| GB | 2016639 A | 9/1979 |
| JP | S59158818 U | 10/1984 |
| JP | H05202512 A | 8/1993 |
| KR | 101706762 B1 | 2/2017 |
| KR | 102116480 B1 | 5/2020 |

OTHER PUBLICATIONS

ADS, "ADS 4-in x 10-ft Corrugated Perforated Pipe", webpage, lowes.com, Item #24138, Model #04040010, https://www.lowes.com/pd/ADS-4-in-x-10-ft-Corrugated-Perforated-Pipe/50163591?cm_mmc=shp-_-c-_-prd-_-plb-_-ggl-_-LIA_PLB_142_Pipe-Fittings-_-50163591-_-local-_-0-_-0&gad_source=1&gclid=Cj0KCQiAj_CrBhD-ARIsAliMxT9VKyfsLSUyw2KTfJijPFOR8zKIpLlyhi9-_u17PzXLQCySRPAPWzYaAjFVEALw_wcB&gclsrc=aw.ds.
Written Opinion of the International Searching Authority dated Apr. 2, 2024.

* cited by examiner

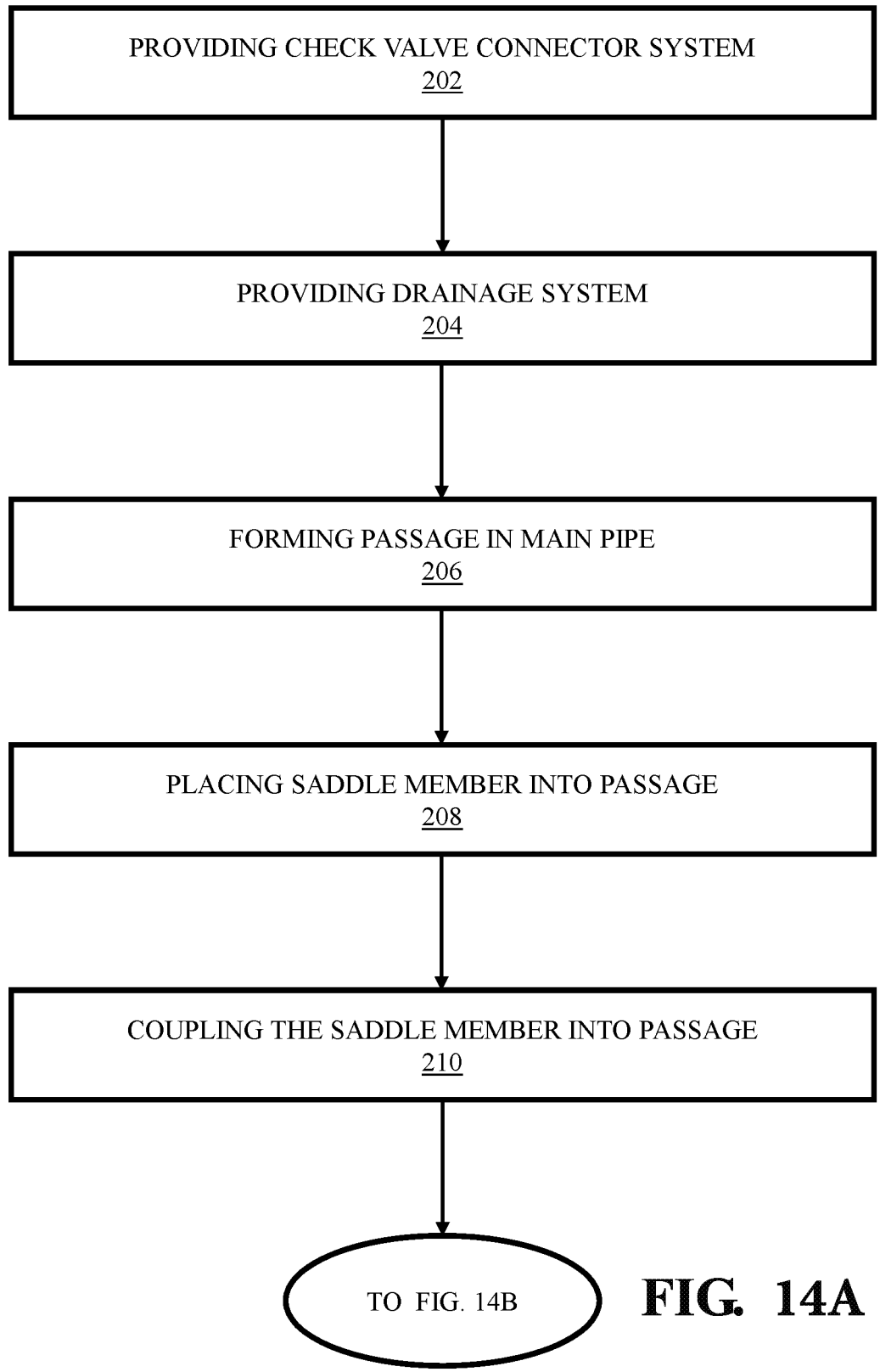

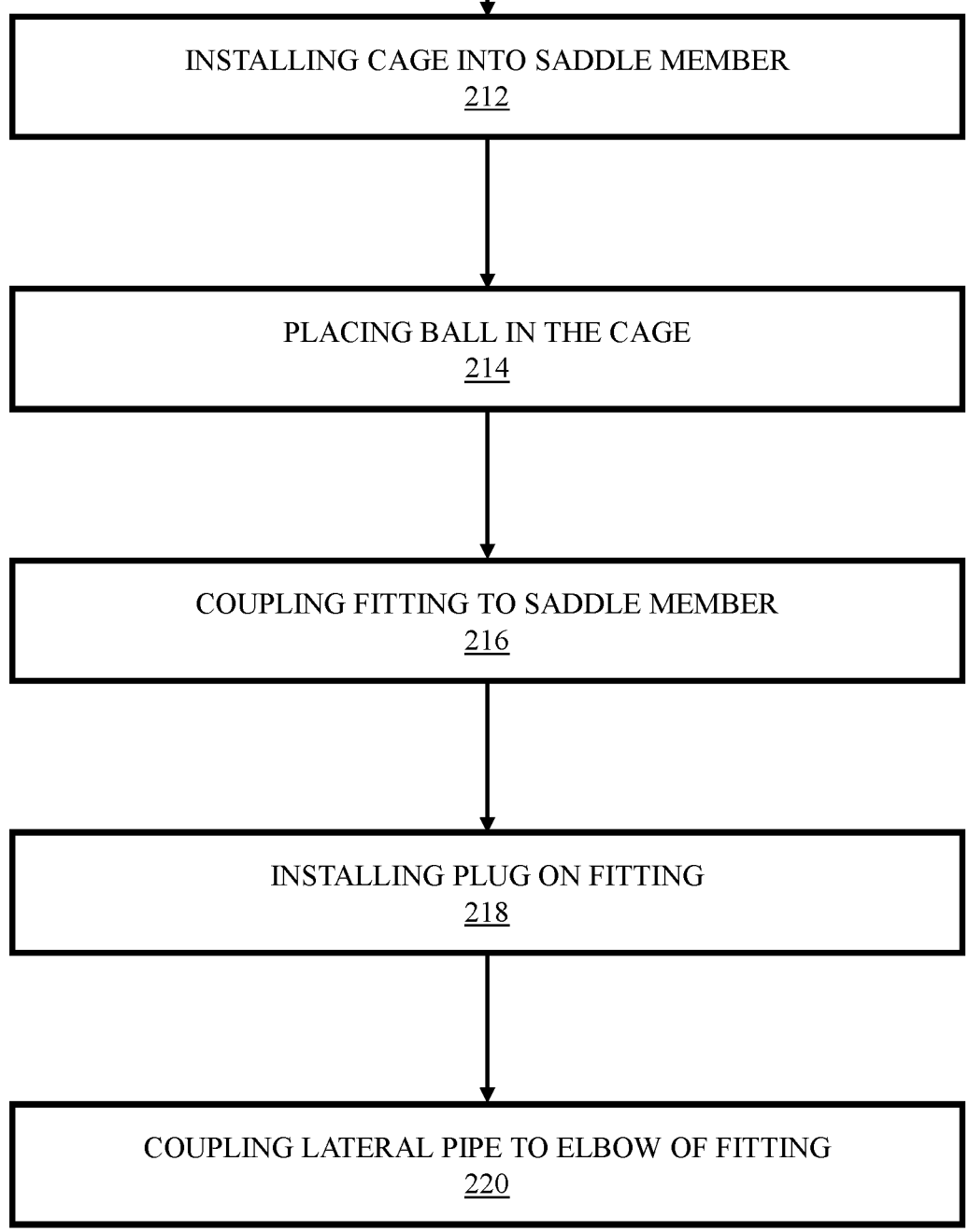

CHECK VALVE CONNECTOR SYSTEM

CROSS-REFERENCE TO RELATED APPLICATIONS

This application claims the benefit of U.S. Provisional Application No. 63/432,514, filed on Dec. 14, 2022. The entire disclosure of the above application is hereby incorporated herein by reference.

FIELD

The present technology relates to drainage systems and, more particularly, a polygonal check valve connector system for a subsurface water drainage system.

INTRODUCTION

This section provides background information related to the present disclosure which is not necessarily prior art.

Check valve connectors play a crucial role in various fluid handling and discharge systems, serving as essential components that allow the flow of fluid in one direction while preventing backflow in the opposite direction. These connectors are designed to ensure the unidirectional flow of fluids, offering reliable and efficient control in a wide range of applications across industries such as plumbing, manufacturing, farming, and more.

One of the primary advantages of check valve connectors is their ability to prevent the unwanted reversal of flow, which can be critical in systems where maintaining a consistent and controlled direction of fluid movement is essential. These connectors feature a simple yet effective design, typically consisting of a valve body with an internal valve mechanism, often a hinged flap, a spring-loaded disc, or a ball, which opens in response to forward flow and closes when the flow direction is reversed. This mechanism ensures that the medium can flow freely in one direction while automatically blocking any attempt at reverse flow.

With respect to the agricultural industry, attempts have been made to restrict the discharge of subsurface water on farm fields for several reasons such as after a rain event for a growing crop, while applying manure to prevent runoff that could contaminating water ways, and for recharging underground water aquifers. For example, it can be desirable to remove excess water, (surface or subsurface) in a field used for agricultural purposes, to prevent damage to crops, improve the condition of the soil, and to permit earlier entrance onto fields after rainfall. Additional considerations include limiting an amount of water discharge that can accumulate after a rain downpour when growing crops, limiting water discharge while applying manure to prevent runoff that could contaminate waterways, or limiting water discharge from a farm to recharge underground water aquifers. Various attempts have been made to restrict the discharge of subsurface water on farm fields but have unfortunately failed. Those methods include plugging one or more drainage outlets or installing an engineered structure near such outlets that effectively acts as a weir. However, water can leave the field if the water table exceeds that of the highest weir board or pipe.

To this point, there are several methods for restricting the discharge of subsurface water such as plugging the outlet or installing an engineered structure near the outlet that effectively acts that of a weir. However, with these methods water can only leave a field if the water table exceeds that of the highest weir board or pipe. As such, the problem with these methods is that water from higher ground will use the underground piping system and flow to the lower ground. Therefore, during times of high-water usage by growing crops, the farmer does not water leaving the farm field, thus reducing yield potential.

Another consideration when dealing with drainage is varying degrees of elevation over a farm field. Unless a farm field is extremely level in terms of elevation, a single water control structure will only cover a portion of the field. This portion comprises of land that is within several feet of elevation change surrounding the device. For high elevations changes within a system, in addition to the water control structure, there are additional devices that have been designed to be installed in-line with the main pipe. However, the additional devices only work within a range of several feet of elevation change which, in essence creates a stair steps effect of water levels until the highest elevation is reached. This can result in multiple devices and additional expense.

Accordingly, there exists a need for a way to eliminate a need for water control structure and in-pipe devices by including a shut-off valve at the outlet to stop all water flow from leaving the field.

SUMMARY

In concordance with the instant disclosure, a polygonal check valve connector system that eliminates a need for water control structure and in-pipe devices by including a shut-off valve at the outlet to stop all water flow from leaving the field, has surprisingly been discovered.

The present disclosure provides a check valve connector system for coupling a lateral pipe and a main pipe. The check valve connector system can include a fitting, a saddle member, and a check valve. The fitting can include a first end, a second end, an elbow, and an opening. The opening can be formed between the first end and the second end. The first end can be configured to receive the main pipe. The elbow can extend outwardly from the fitting and can include an aperture. The aperture can include a pear-shaped cross section and can be configured to receive the lateral pipe. The saddle member can be configured to couple the fitting and the main pipe. The saddle member can include a hole for receiving the fitting. The check valve can be disposed between the fitting and the saddle member.

In a preferred embodiment, the check valve can include a cage and a ball. The cage can be disposed within the hole of the saddle member. The ball can be disposed within the cage and can be configured to move between an open position and a closed position.

The present disclosure further provides a method for installing a check valve connector system. The check valve connector system can be provided. A hole can be made on the surface of the main pipe to allow access into the interior of the main pipe. The second edge of the saddle can be placed into the hole and the saddle can be coupled to the main pipe by either welding by chemicals or by heat. The cage can be installed on the first end of the saddle and the ball can be placed within the cage. The second end of the fitting can be coupled to the first edge of the saddle member and the cap can be installed upon the first end of the fitting. The lateral pipe can be coupled to the elbow of the fitting.

The check valve connector system of the present disclosure eliminates the need for a water control structure and in-line device and instead implements a shut-off valve disposed at the outlet. When the check valve is closed, the water can fill the main pipe and the ball can float to seal off each lateral pipe connection effectively stopping water flow from leaving the field and flowing into the system. To this point, water can migrate past the drainage system effective level and further into the depths of the subsoil and allow for recharging of moisture in the off season as most drainage systems drain water year-round, 24/7. This can aid plants with deep roots as they require water during the off season.

The check valve connector system can also include a removable threaded plug or cap that can allow for inspections or even clean-out of the main pipe or lateral pipe. Current water control structures do not allow this type of inspection and clean out of corrugated pipe systems and/or drainage systems.

The check valve connector system can include a two-piece plastic construction, including a fitting and a saddle member. The fitting can include an elbow with a male threaded connection on one end and a female polygonal shape on the other. The saddle member can include female threaded connection on one end configured to receive the male connection of the fitting and the other end can include a pipe shape with a slight taper combined to a saddle member to mate with the main pipe. The check valve connector system can further include a cage and a ball, both formed of stainless steel. A top cleanout plug of the fitting can be of plastic or metal (bronze) with metal being preferred since a metal detector can be a valuable tool to locate underground piping connections.

The check valve connector system of the present disclosure can be used as an adaptor to connect lateral pipes to a main pipe. The system can also allow the flow of water in only one direction. The check valve connector system can be disposed adjacent to and, in certain embodiments, be coupled to the main pipe, which is commonly a PVC smooth wall pipe. In operation, an opening in the main pipe can be made by drilling a pilot hole first and then forming a flanged opening with special tooling and heat. The saddle member of the can be coupled to the main pipe by welding by either chemical or heat. In this way, a watertight connection capable of withstanding low pressure is created. The cage and ball can be installed into the saddle member to create the check valve functionality. The elbow portion of the fitting can be threaded into the saddle member. The lateral pipe matching the shape of the elbow opening can be connected to the main line. In desired circumstances, the top of the fitting can be used for inspections or cleaning of the drainage system. In operation, the check valve connector will only need to restrict water flow if the main is full of water therefore causing the ball to float and seal off flow from the lateral pipe to the main pipe. To achieve this, a check valve at the outlet is necessary. To achieve this, the check valve can be one of a ball, a gate, or a butterfly valve.

The fitting and the saddle member of the check valve connector system can be manufactured using plastic injection molding while the cage and the ball can be formed of stainless steel.

The lateral pipe can be installed at a depth and grade depending upon field contour. Spacing of lateral pipes and depth is variable, however the desired spacing and depth is about 20 feet apart at a depth of 20 inches in certain embodiments.

The lateral drainage channel can be installed using a wheel machine that creates a profile similar to that of the drainage tile itself. This can facilitate a good fit for the drainage tile to orient the holes/slots properly. This can also militate against the tile from collapsing if the drainage tile was driven over where the tile is newly installed. Utilizing a wheel machine installation can militate against crushing and can reduce the amount of loose soil that can end up in the drainage channel and can provide optimum performance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 2:
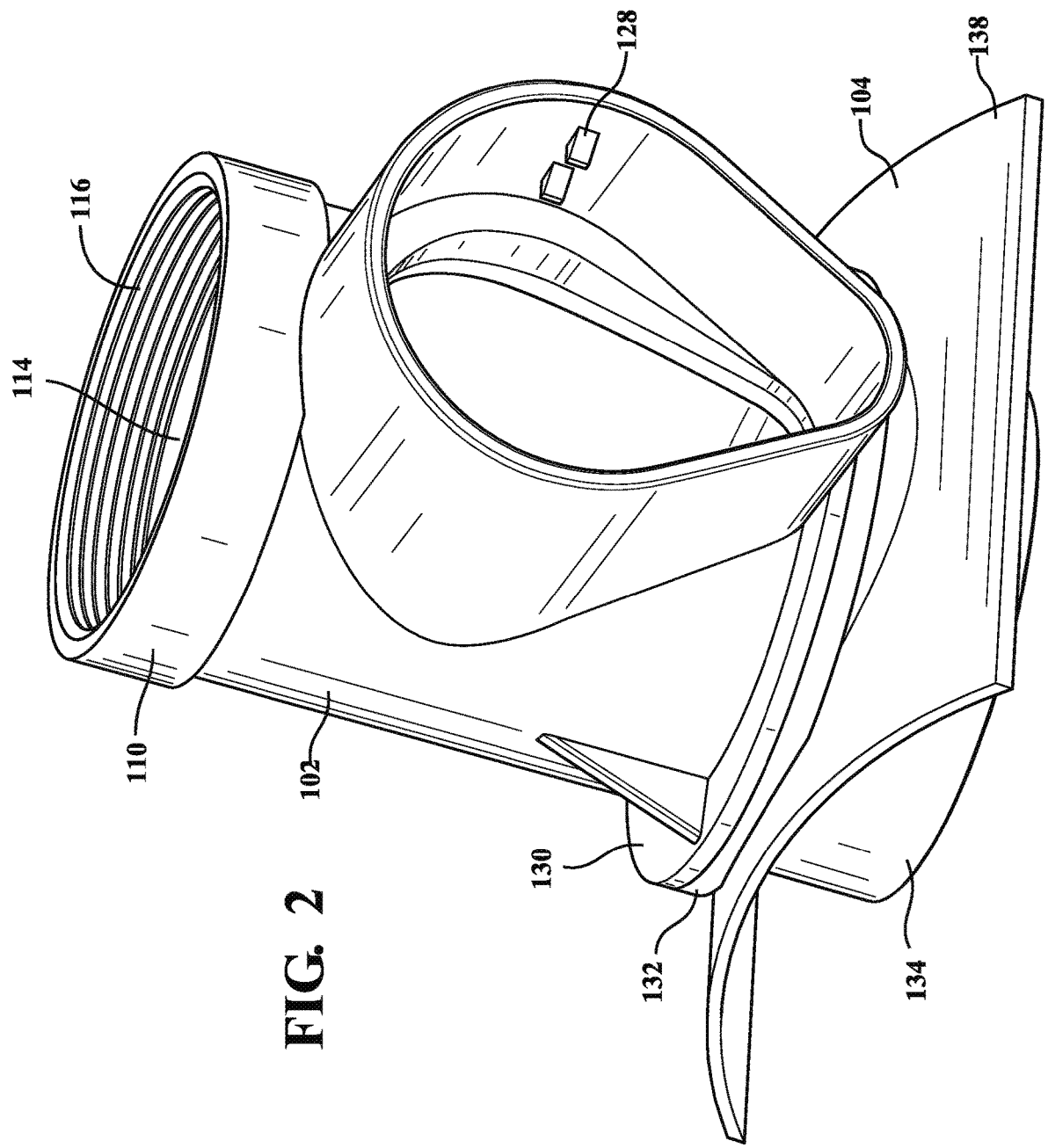
Figure 3:
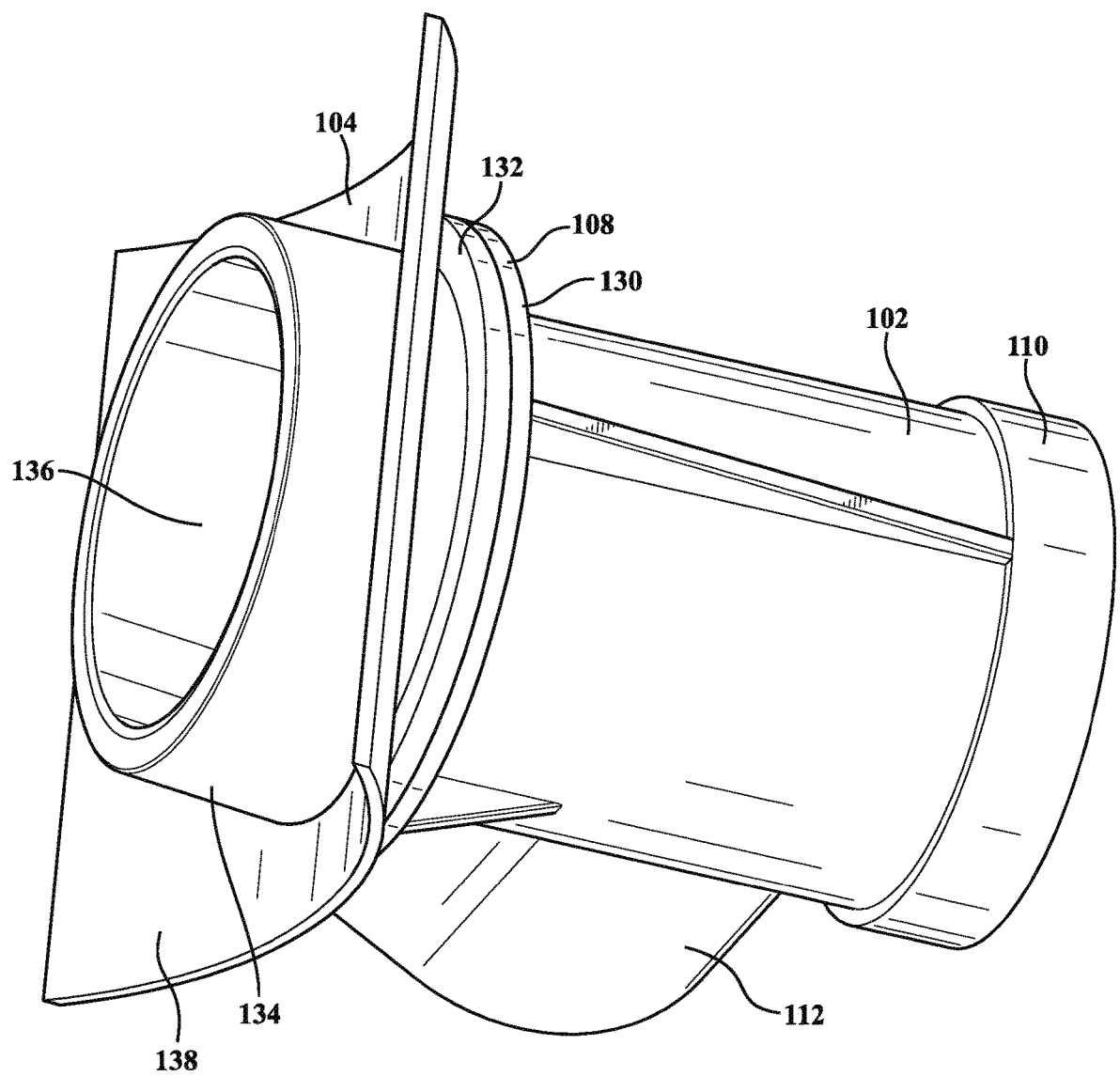
Figure 4:
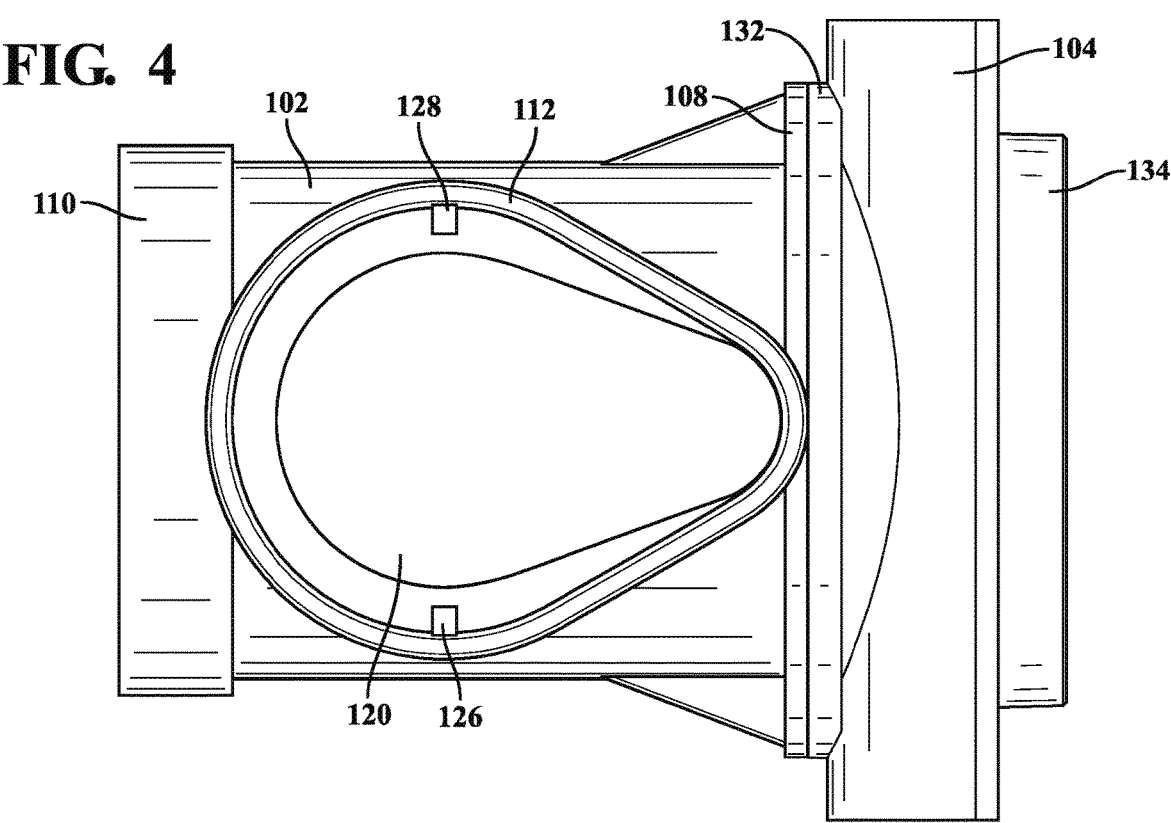
Figure 5:
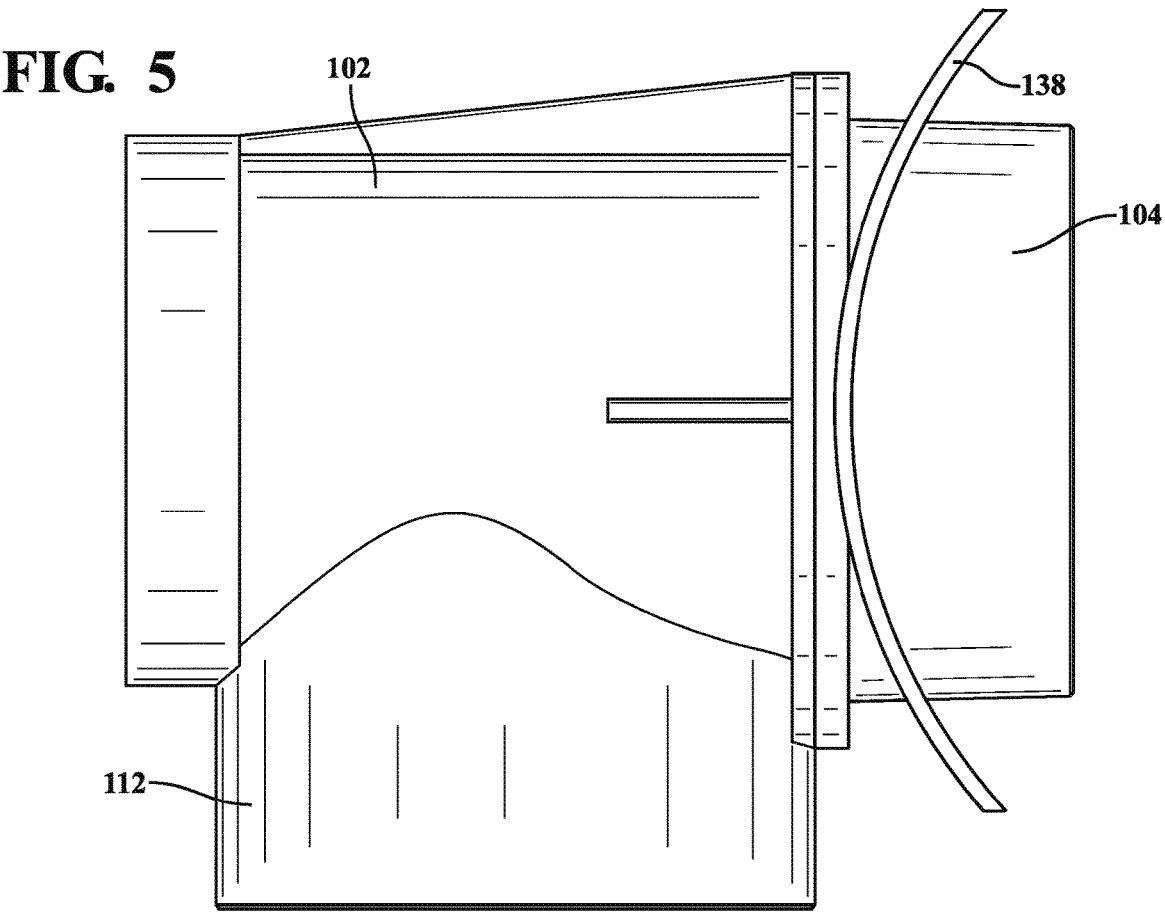
Figure 6:
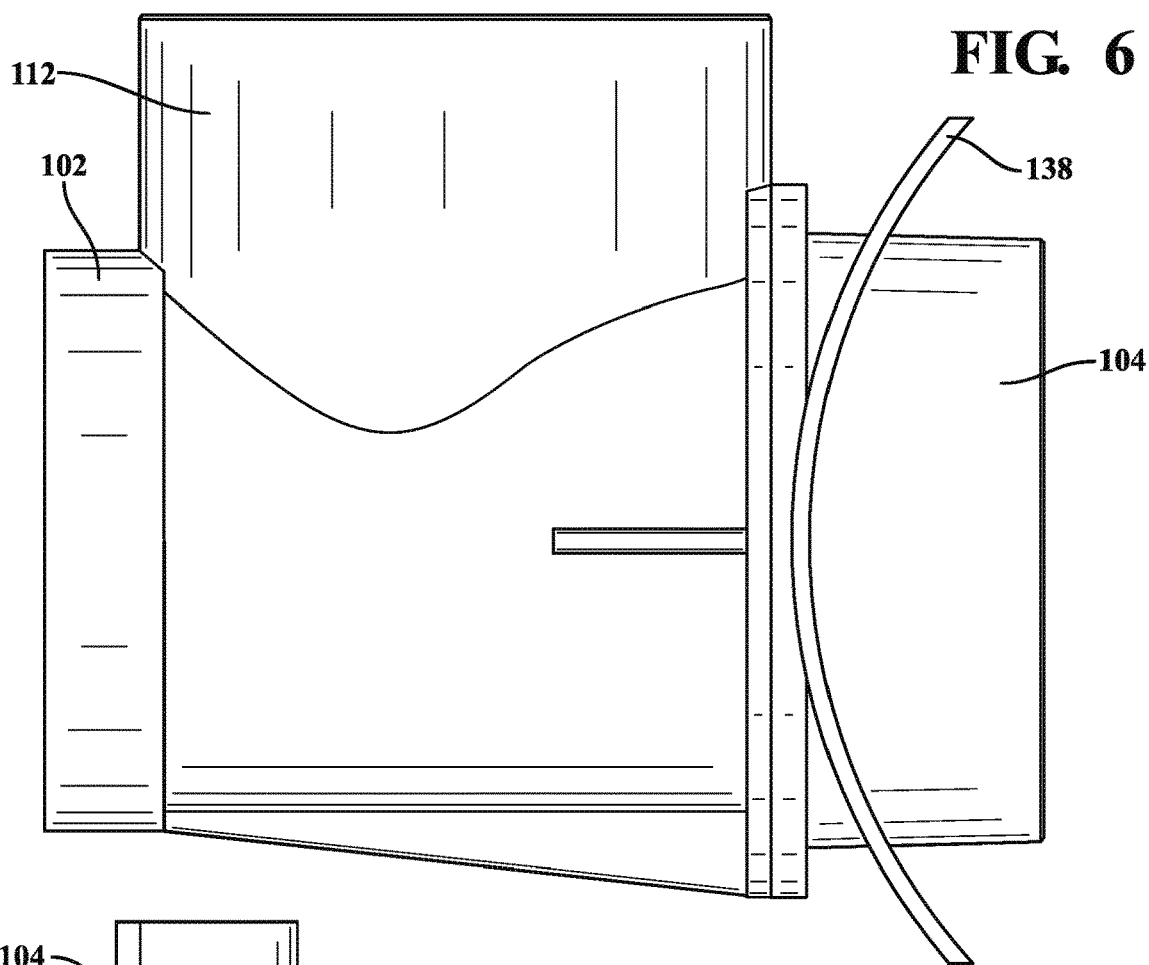
Figure 7:
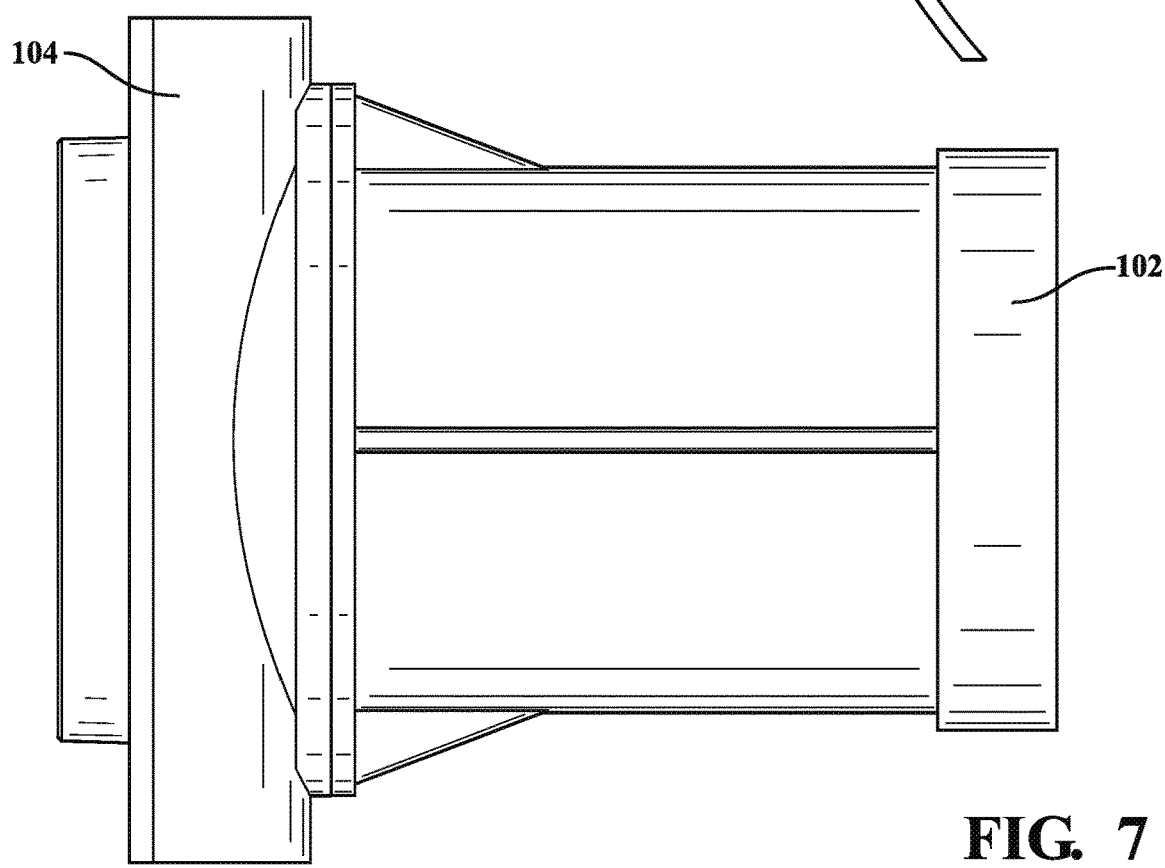
Figure 8:
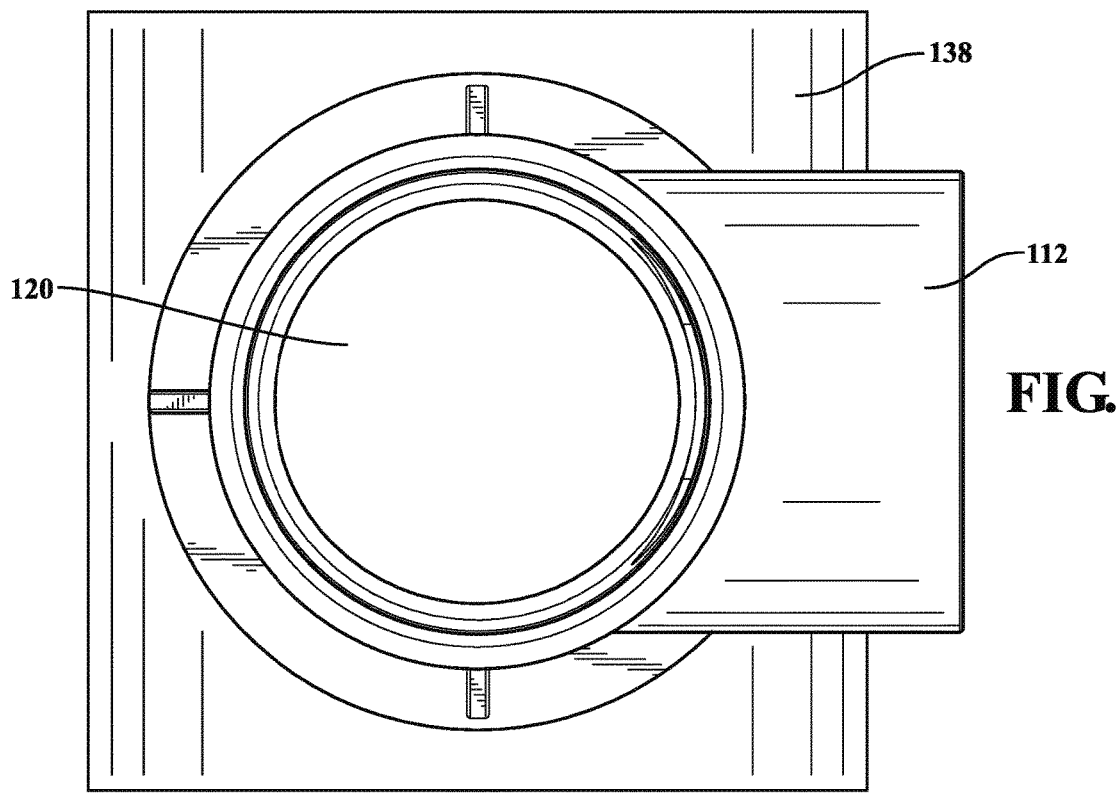
Figure 9:
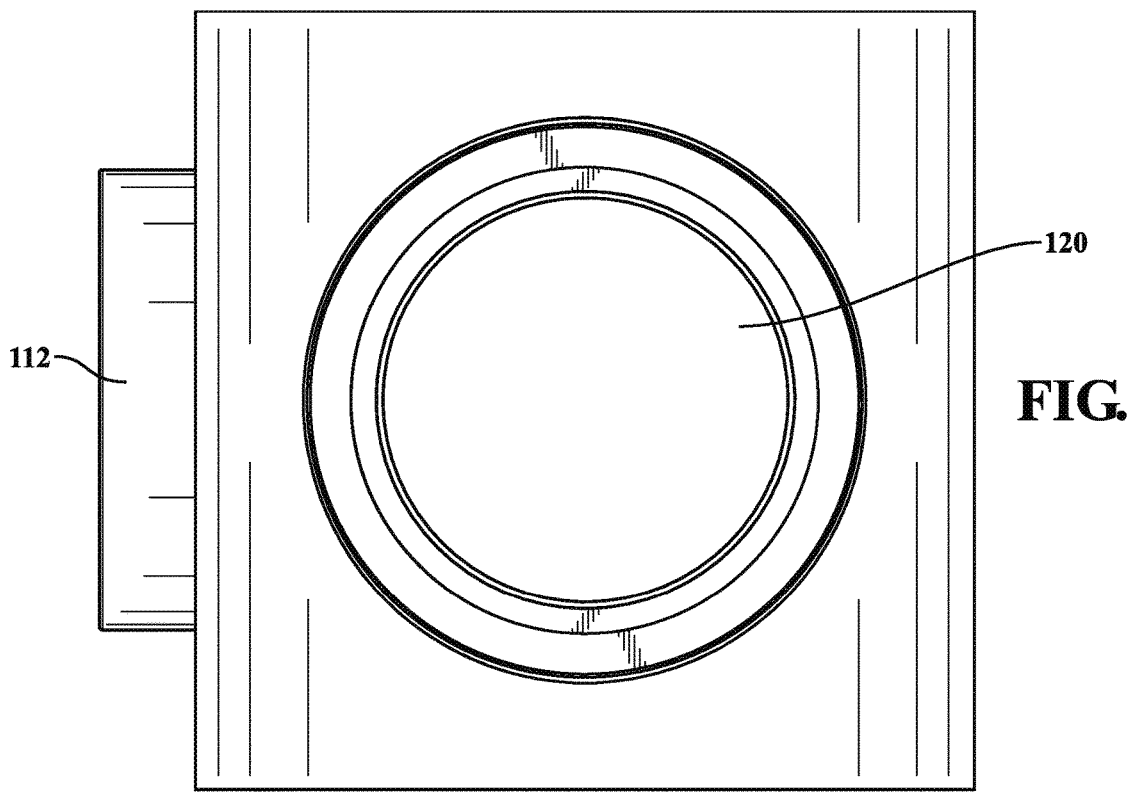
Figure 10:
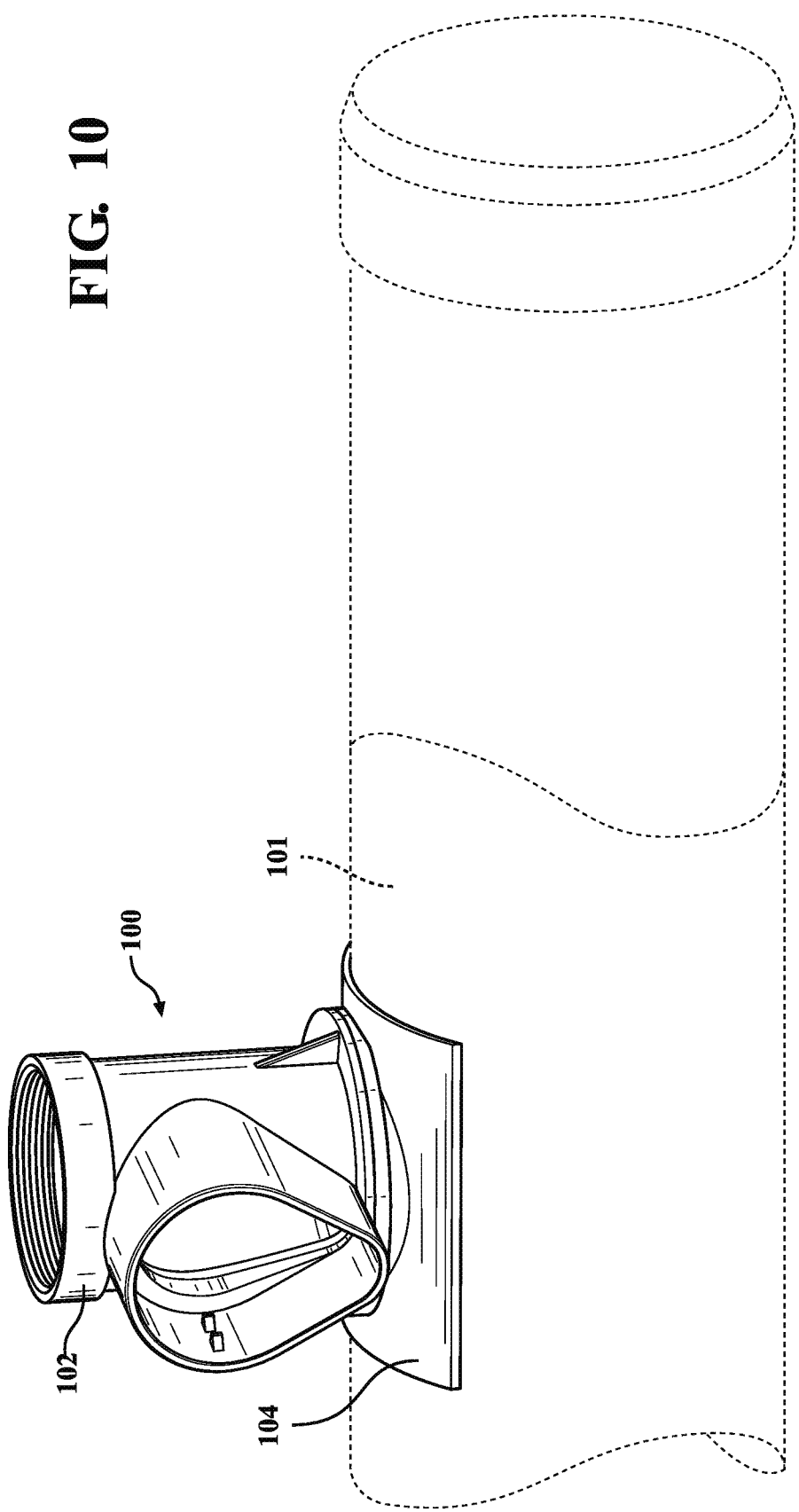
Figure 11:
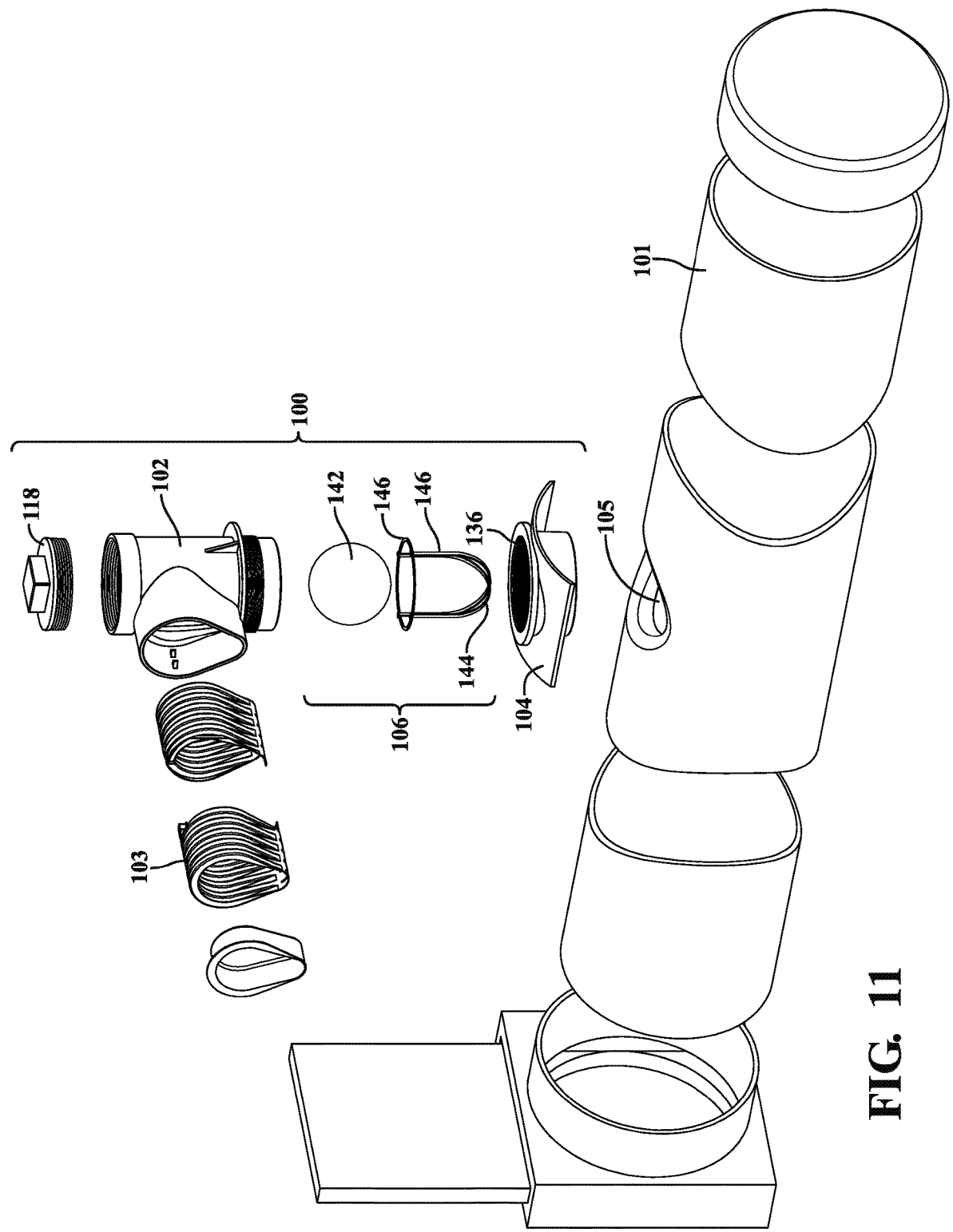
Figure 12:
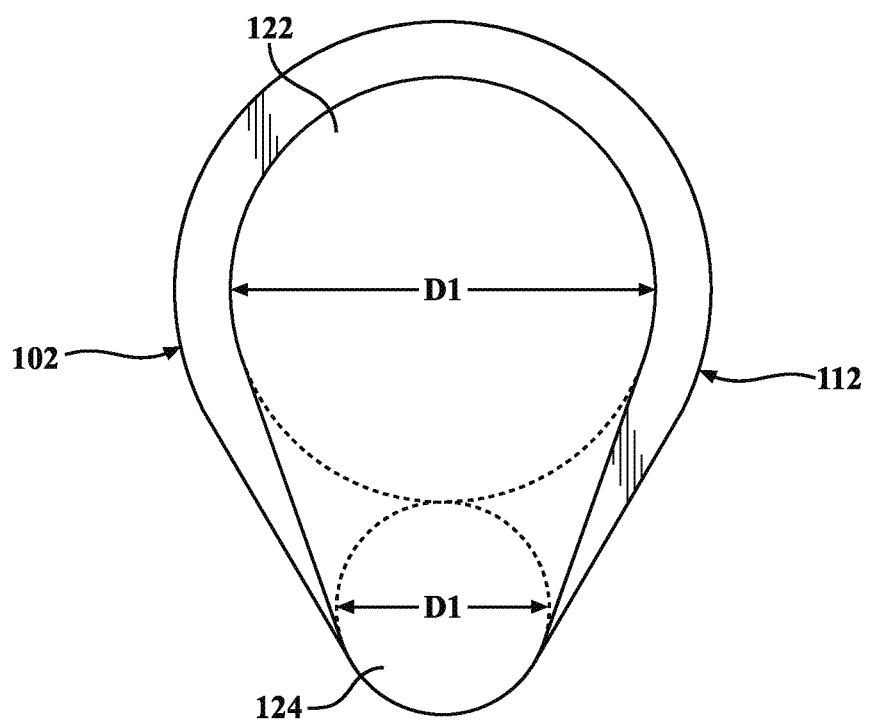
Figure 13A:
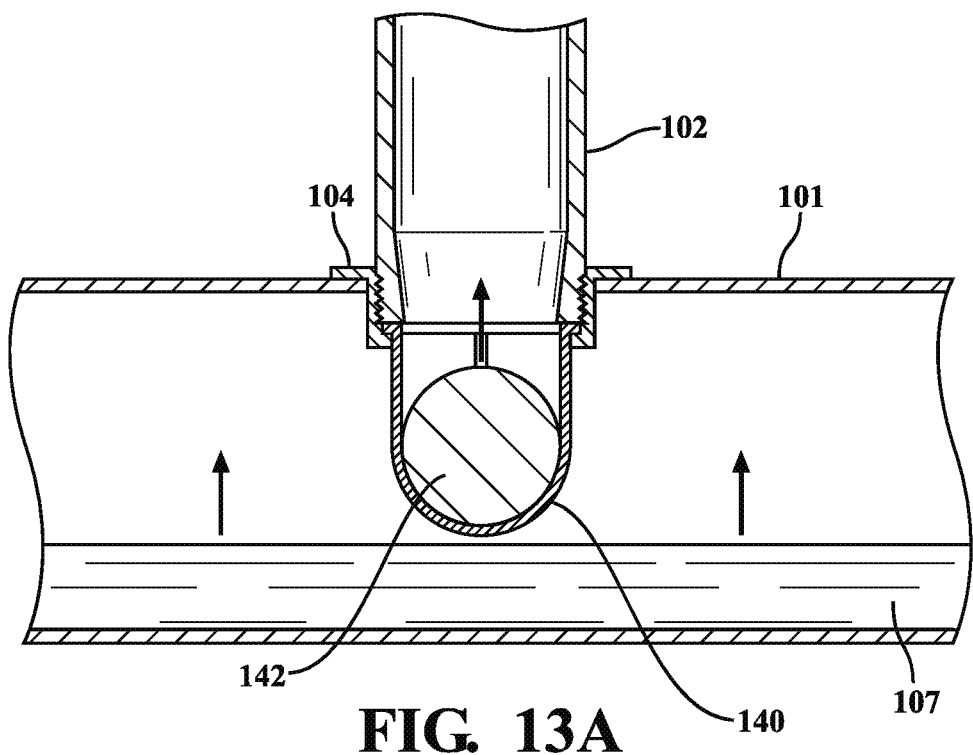
Figure 13B:
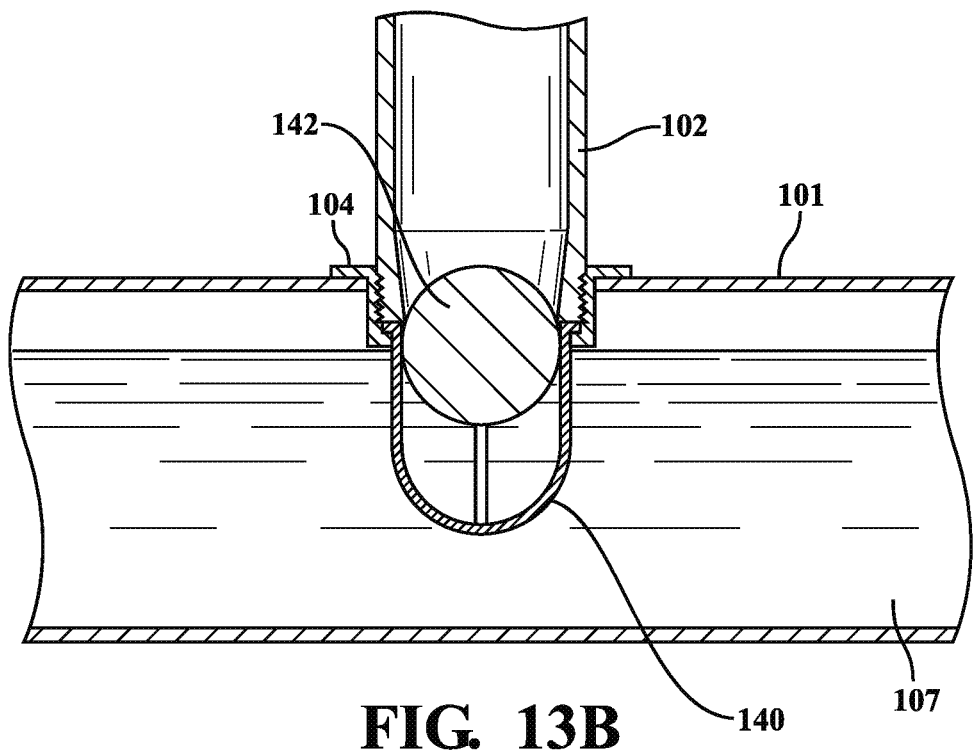

FIG. 1 is a top perspective view of a fitting of a check valve connector system;
FIG. 2 is a bottom front perspective view thereof;
FIG. 3 is a bottom rear perspective view thereof;
FIG. 4 is a front elevational view thereof;
FIG. 5 is a top plan view thereof;
FIG. 6 is a bottom plan view thereof;
FIG. 7 is a rear elevational view thereof;
FIG. 8 is a right-side elevational view thereof;
FIG. 9 is a left-side elevational view thereof;
FIG. 10 is an environmental view of the check valve connector system coupled to a main pipe and a lateral pipe;
FIG. 11 is an exploded view thereof;
FIG. 12 is front elevational, cross-sectional view of an elbow of the check valve connector system;
FIG. 13A is a cross sectional view of a ball of the check valve connector system in an open position;
FIG. 13B is a cross sectional view of the ball of the check valve connector system in a closed position; and
FIGS. 14A-14B are flow diagrams illustrating a method for installing a check valve connector system to the main pipe and the lateral pipe.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides a check valve connector system 100 for a drainage system including a main pipe 101 and a lateral pipe 103, shown generally in FIGS. 1-13. The check valve connector system 100 can couple the main pipe 101 and the lateral pipe 103, where an example is shown in FIG. 11. The check valve connector system 100 can include a fitting 102, a saddle member 104, and a check valve 106. Advantageously, the check valve connector system 100 can operate with the main pipe 101 of a subsurface water drainage system to effectively and efficiently drain subsurface water. Desirably, the check valve connector system 100 can provide a water drainage system with a means for closing off a lateral pipe 103 and therefore can militate against water flow from leaving a field when water fills the main pipe 101.

With reference to FIGS. 2 and 4, the fitting 102 can include a first end 108, a second end 110, and an elbow 112. The fitting 102 can further include an opening 114 that spans the distance between the first end 108 and the second end 110. Each of the first end 108 and the second end 110 can include couplings 116, shown in FIG. 11. The first end 108 can be configured to receive the main pipe 101 via a male threaded connection. Advantageously, the threaded end can allow for easy assembly with a new or preexisting drainage system. One of ordinary skill in the art can select other suitable fastening means for the fitting within the scope of the present disclosure. The second end 110 of the fitting can be threadably coupled to a plug 118, as shown in FIG. 11. The plug 118 can be a removably threaded to allow for inspection or to clean out the check valve connector system 100, the main pipe 101, or the lateral pipe 103, as desired. The plug 118 can be formed of plastic or metal, such as bronze, as desired. Advantageously, in a preferred embodiment where the plug 118 is constructed of metal, a metal detector can be used to locate underground piping connections.

As shown in FIG. 1, the elbow 112 can extend outwardly from the fitting 102 at a substantially perpendicular angle. The elbow 112 can include an aperture 120. The aperture 120 can be shaped to receive the lateral pipe 103. As the lateral pipe 103 can be polygonal, the aperture 120 can be any shape such that aperture 120 can receive the lateral pipe 103. A skilled artisan can select a shape for the aperture 120, as desired. In one example and as shown in FIG. 12, the aperture 120 can include a pear-shaped cross section. In this way, the aperture 120 can be coupled to a lateral pipe 103 having a pear-shaped cross section, such as the drainage channel disclosed in co-owned U.S. patent application Ser.

No. 17/987,297 POLYGONAL DRAINAGE CHANNEL SYSTEM AND METHOD, the entire disclosure of which is hereby incorporated herein by reference. The aperture 120 can further include a female connection to connect to a male connection on the lateral pipe 103.

With continued reference to FIG. 12, the elbow 112 and the aperture 120 can include a substantially polygonal cross-section, as described herein, where the substantially polygonal cross-section can be formed by three or more connected line segments, but where the line segments can include curved lines. Examples further include where the substantially polygonal cross-section can include line segments joined by rounded corners or edges. More specifically, the cross-section of the elbow 112 can be formed to resemble a "upside-down pear." In other words, the elbow 112 can have a general shape that, as shown in FIG. 12, can be created by first placing a top circle 122 and a bottom circle 124 of different diameters on top of one another. The two circles 122, 124 can then be connected with two tangential lines, one on each side. The top circle 122 can have a first diameter (D1) and the bottom circle 124 can have a second diameter (D2). The shape that is created therefore can define the internal shape of the elbow 112. As shown in FIG. 12, the first diameter (D1) can be greater than the second diameter (D2). A skilled artisan can select a suitable first diameter and second diameter within the scope of the present disclosure.

It should be appreciated that the interior of the elbow 112 can include a projection 125, as shown in FIG. 1. The projection 125 can be configured to secure the lateral pipe 103 within the elbow 112 of the fitting 102. In certain instances, and as shown in FIGS. 1-2 and 4, the projection 125 can include two projections, a first projection 126 and a second projection 128, disposed opposite each other within the elbow 112. The projections 126, 128 can be sized to hold the lateral pipe 103 to the elbow 112. Alternatively, the projection 125 can be a continuous projection that circumscribes the interior of the elbow 112. A skilled artisan can select a number and size of the projection 125 within the scope of the present disclosure.

Further, the shape and depth of each of the elbow 112 and of the lateral pipe 103 can depend on the field contour and the specific needs of the user. The spacing of the lateral pipes 103 and the depths are variable depending on the needs of the user. As a non-limiting example, the spacing of the lateral pipes 103 and depth can be 20' spacing at 20" cover to be used in certain embodiments. A skilled artisan can select suitable spacing and depth for installation of one or more check valve connector systems 100 relative to the main pipe 101 and one or more associated lateral pipes 103.

With respect to the fitting 102, the first end 108 can be configured to receive the main pipe 101, as shown in FIGS. 10-11 via the saddle member 104. The first end 108 of the fitting 102 can be coupled to the saddle member 104 by the threaded male coupling 116. The saddle member 104 can be coupled to the main pipe 101 using at least one of sealing glue, sealing cement, and a press fit, as examples. In this way, the main pipe 101 can be fluidly coupled to the check valve connector system 100 via the first end 108 and the lateral pipe 103 can be coupled to the check valve connector system 100 via the aperture resulting in the main pipe 101 and the lateral pipe 103 being disposed in parallel planes.

With reference to FIG. 3, the fitting 102 can include a protrusion 130 that circumscribes the exterior of the fitting. The protrusion 130 can abut a first edge 132 of the saddle member 104 where the check valve connector system 100 is installed with a main pipe 101 and a lateral pipe 103. Advantageously, the protrusion 130 can reinforce the seal between the saddle member 104 and fitting 102 to militate against leaks.

It should be appreciated that an interior surface of the elbow 112 can be smooth to reduce resistance in water flow rate within the check valve connector system 100. Desirably, the smooth interior surface can permit the water flow to be controlled when moving through a drainage system. One of ordinary skill in the art can select a suitable surface texture such that water flow can be controlled within the scope of the present disclosure.

As shown in FIG. 3, the saddle member 104 can include the first edge 132, a second edge 134, and a hole 136 formed from the first edge 132 to the second edge 134. The hole 136 can be configured to receive the check valve 106 and fitting 102 at the first edge 132 and the main pipe 101 at the second edge 134. The saddle member 104 can be configured to couple to the fitting 102 via the threaded coupling 116 and to the main pipe 101 via a scaling glue, sealing cement, press fit, or other similar affixing means, and can be disposed adjacent to a main pipe 101. The saddle member 104 can include a flange 138. The flange 138 can have a curvature substantially similar to the curvature of the exterior of the main pipe 101 such that the flange 138 can nest with and conform to a portion of the main pipe 101, as shown in FIG. 10. The curvature of the flange 138 can be altered to allow for the saddle member 104 to nest with pipes of various sizes, as desired. A skilled artisan can select a suitable curvature for the saddle member 104 within the scope of the present disclosure.

The fitting 102 and the saddle member 104 of the check valve connector system 100 can be manufactured using various methods for plastic forming, such as injection molding. Where the fitting 102 and the saddle member 104 of the check valve connector system 100 are formed via plastic injection molding via an extruder, a moving set of dies that form the outside wall of the desired shape are utilized. Once formed, the fitting 102 and the saddle member 104 can be cooled, most typically with water. The fitting 102 and the saddle member 104 of the check valve connector system 100 can be formed from any rigid material. Examples of materials that can be used for forming the fitting 102 and the saddle member 104 of the check valve connector system 100 can include high density polyethylene (HDPE), types of polyvinyl chloride (PVC), acrylonitrile butadiene styrene (ABS), and other plastics as known to those of skill in the art. A skilled artisan can select a suitable material for forming the fitting 102 and the saddle member 104, as desired.

The check valve connector system 100 can include a check valve 106 disposed between the fitting 102 and the saddle member 104. The check valve 106 can be a swing check valve or a quarter-turn rotational motion valve, such as a butterfly valve. In a preferred embodiment, the check valve 106 can be a ball check valve including a cage 140 and a ball 142. The cage 140 can be disposed within the hole 136 of the saddle member 104 and rest within the main pipe 101 and the ball 142 can be disposed within the cage 140. The ball 142 can be configured to move between an open position, as shown in FIG. 13A, and a closed position, as shown in FIG. 13B. In the open position, where the water level 107 in the main pipe 101 does not reach a top portion of the main pipe 101, the ball 142 can rest in a bottom 144 of the cage 140, unable to float as the water level 107 has not reached the bottom 144 of the cage 140. Where the water level 107 within the main pipe rises enough to cause the ball 142 to float within the cage 140, the ball 142 can float to a top 146 of the cage 140 to seal off the first end 108 of the fitting 102 from the main pipe 101. This can effectively militate against water continuing to flow through the check valve connector system 100, into the lateral pipe 103, and militate against water flowing out into the field. The water can migrate past the drainage system and further into the depths of the subsoil in order to reach deep roots.

As shown in FIGS. 13A-13B, an inner wall of the fitting 102 may also have an angle adjacent the first end 108 of the fitting 102 that results in an opening at the first end 108 of the fitting 102 being of an interior diameter that is less than an interior diameter of a remainder of the fitting 102. For example, the angle may be between about one degree (1°) and about ten degrees (10°), and more particularly about five degrees (5°) relative to the inner wall of the remainder of the fitting 102. In operation, the angle creates a hard stop for the ball 142 so that the ball 142 can seal off the first end 108 of the fitting 102. One of ordinary skill in the art may also select other suitable angles for the inner wall at the first end 108 of the fitting 102 within the scope of the present disclosure.

In a preferred embodiment, the cage 140 can be formed from stainless steel, as desired. The cage 140 can be stamped, formed, or welded from stainless steel during manufacturing. Further, the ball 142 can be hollow such that the ball 142 can float in the water to allow for the check valve 106 to control the subsurface water drainage, as described herein.

It should be appreciated that the check valve connector system 100 can be used to reduce runoff of fertilizers and manure into streams, rivers, and lakes. As described herein, the check valve 106 can move to the closed position within the main pipe 101 when the main pipe 101 is full of water. The ball 142 can float to the top 146 of the cage 140, and therefore, the first end 108 of the fitting 102, in order to block the opening to the lateral pipe 103. Where the ball 142 blocks the lateral pipe 103 connection, the water flow can be manipulated and can militate against pouring out or pouring in the system 100. This can allow the water flow to be controlled such that it reduces the possibility of overflow. It should be noted that the check valve 106 will be met with some water pressure and can be installed to withstand the water pressure in order to militate against leaks and sinkholes that could form from soil erosion due should there be leaks from the check valve.

The present disclosure further includes a method 200 for controlling water in a field. An exemplary embodiment of the method 200, including installing check valve connector system 100 is shown in FIGS. 14A-14B. In a step 202, the check valve connector system 100 of the present disclosure can be provided. In a step 204, a drainage system including a main pipe 101 and a lateral pipe 103 can be provided. A passage 105 can be made on the surface of the main pipe 101 to allow access into the interior of the main pipe 101, in a step 206. It should be noted that the main pipe 101 can be made from a smooth plastic, such as PVC, and can include a smooth interior wall. The passage 105 can be formed by drilling a pilot hole and subsequently swaging the pilot hole with special tooling, as well as heat, a scaling compound, or a press fit, as examples, to create the passage 105 configured to receive the second edge 134 of the saddle member 104. Advantageously, this creates a water-tight connection such that it is capable of withstanding low pressure. In a step 208, the second edge 134 of the saddle member 104 can be placed into the passage 105. In a step 210, the saddle member 104 can be coupled to the main pipe 101 by either welding by chemicals or by heat. The cage 140 can be installed on the first edge 132 of the saddle member 104 in a step 212. In a step 214, the ball 142 can be placed within the cage 140. The first end 108 of the fitting 102 can be coupled to the first edge 132 of the saddle member 104 in a step 216. In a step 218, the plug 118 can be installed upon the second end 110 of the fitting 102. The lateral pipe 103 can be coupled to the elbow 112 of the fitting 102 in a step 220.

Advantageously, the polygonal check valve connector system 100 and method 200 as described hereinabove effectively eliminates a need for the water control structure and in-pipe devices by including a shut-off valve at the outlet to stop all water flow from leaving the field, in operation.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A check valve connector system for coupling a lateral pipe and a main pipe, comprising:
    a fitting including a first end, a second end, an elbow, and an opening formed between the first end and the second end and fluidly coupled to the elbow, the first end configured to receive the main pipe, the elbow extending outwardly from the fitting and including an aperture having a pear-shaped cross section and configured to receive the lateral pipe;
    a saddle member configured to couple the fitting and the main pipe, the saddle member including a hole for receiving the fitting; and
    a check valve disposed between the fitting and the saddle member.

2. The check valve connector system of claim 1, wherein the check valve includes:
    a cage disposed within the hole; and
    a ball disposed within the cage and configured to move between an open position and a closed position.

3. The check valve connector system of claim 2, wherein the ball is hollow.

4. The check valve connector system of claim 2, wherein the cage is formed from metal.

5. The check valve connector system of claim 1, wherein the check valve includes one of a ball check valve, a swing check valve, and a quarter-turn rotational motion valve.

6. The check valve connector system of claim 1, wherein the pear-shaped cross section is formed from a top circle and a bottom circle connected by tangential lines on each side thereof.

7. The check valve connector system of claim 6, wherein the top circle has a first diameter and the bottom circle has a second diameter.

8. The check valve connector system of claim 7, wherein the first diameter is greater than the second diameter.

9. The check valve connector system of claim 1, wherein the saddle member includes a flange.

10. The check valve connector system of claim 9, wherein the flange includes a curvature.

11. The check valve connector system of claim 10, wherein the curvature of the flange allows for the flange to nest with the main pipe.

12. The check valve connector system of claim 1, further including a plug configured to couple with the first end of the fitting.

13. The check valve connector system of claim 12, wherein the plug is threadably coupled to the first end.

14. The check valve connector system of claim 1, wherein the fitting includes a protrusion disposed between the first end and the elbow.

15. The check valve connector system of claim 1, wherein the elbow includes a projection configured to hold the lateral pipe when received thereby.

16. The check valve connector system of claim 15, wherein the elbow includes a first projection and a second projection disposed opposite each other within the elbow.

17. The check valve connector system of claim 1, wherein the elbow includes a smooth interior surface.

18. A check valve connector system for coupling a lateral pipe and a main pipe, comprising:
a fitting including:
a first end configured to receive the main pipe,
a second end,
an elbow extending outwardly from the fitting and including:
an aperture having a pear-shaped cross section and configured to receive the lateral pipe, the pear-shaped cross section formed from a top circle having a first diameter and a bottom circle having a second diameter connected by tangential lines on each side thereof, the first diameter being greater than the second diameter,
a protrusion disposed between the first end and the elbow, and
a first projection and a second projection, the first projection and the second projection disposed opposite each other within the elbow, the first projection and the second projection configured to hold the lateral pipe when received thereby, and
an opening formed between the first end and the second end and fluidly coupled to the elbow;
a saddle member configured to couple the fitting and the main pipe, the saddle member including a hole for receiving the fitting and a flange having a curvature that allows for the flange to nest with the main pipe;
a check valve disposed between the fitting and the saddle member and including:
a metal cage disposed within the hole, and
a hollow ball disposed within the metal cage and configured to move between an open position and a closed position; and
a plug configured to couple with the first end of the fitting and threadably coupled to the first end.

19. A method for controlling water in a field, comprising:
providing a drainage system including a main pipe and a lateral pipe;
providing a check valve connector system including:
a fitting including a first end, a second end, an elbow, and an opening formed between the first end and the second end and fluidly coupled to the elbow, the first end configured to receive the main pipe, the elbow extending outwardly from the fitting and including an aperture having a pear-shaped cross section and configured to receive the lateral pipe,
a saddle member configured to couple the fitting and the main pipe, the saddle member including a hole for receiving the fitting, and
a check valve disposed between the fitting and the saddle member; and
installing the check valve connector system to the drainage system by coupling the elbow to the lateral pipe and the saddle member to the main pipe.

20. The method for controlling water in a field of claim 19, wherein the check valve further includes a cage disposed within the hole and a ball disposed within the cage and configured to move between an open position and a closed position and further including a step of installing the cage and the ball between the fitting and the saddle member.

* * * * *